(12) United States Patent
Kamishiro

(10) Patent No.: US 9,886,587 B2
(45) Date of Patent: Feb. 6, 2018

(54) INFORMATION PROCESSING APPARATUS, INFORMATION PROCESSING SYSTEM, AND INFORMATION PROCESSING METHOD

(71) Applicant: Daisuke Kamishiro, Kanagawa (JP)

(72) Inventor: Daisuke Kamishiro, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 66 days.

(21) Appl. No.: 14/762,857

(22) PCT Filed: Jan. 15, 2014

(86) PCT No.: PCT/JP2014/051161
§ 371 (c)(1),
(2) Date: Jul. 23, 2015

(87) PCT Pub. No.: WO2014/129251
PCT Pub. Date: Aug. 28, 2014

(65) Prior Publication Data
US 2015/0363601 A1 Dec. 17, 2015

(30) Foreign Application Priority Data

Feb. 20, 2013 (JP) .................... 2013-031063

(51) Int. Cl.
*G06F 21/60* (2013.01)
*G06F 21/62* (2013.01)
*G06F 3/12* (2006.01)

(52) U.S. Cl.
CPC .......... *G06F 21/608* (2013.01); *G06F 3/1222* (2013.01); *G06F 3/1273* (2013.01); *G06F 21/6254* (2013.01)

(58) Field of Classification Search
CPC .... G06F 21/608; G06F 3/1222; G06F 3/1273; G06F 21/6254
(Continued)

(56) References Cited

U.S. PATENT DOCUMENTS 5,771,354 A   6/1998   Crawford
6,157,461 A * 12/2000  Doron .................. G06K 15/107
                                                347/12
(Continued)

FOREIGN PATENT DOCUMENTS

JP   2005-324450   11/2005
JP   2009-199144    9/2009
(Continued)

OTHER PUBLICATIONS

Extended European Search Report dated Jan. 4, 2016.
(Continued)

*Primary Examiner* — Abu Sholeman
(74) *Attorney, Agent, or Firm* — IPUSA, PLLC

(57) ABSTRACT

An information processing apparatus includes a determination unit configured to determine whether data including identification information of a user satisfy a condition to conceal the identification information, the data being generated when the user uses an apparatus, the condition being stored in a condition storage; a concealing unit configured to execute a concealing process to conceal the identification information included in the data when the data satisfy the condition; and a data storage configured to store one of the data including the identification information and data including the concealed identification information.

3 Claims, 10 Drawing Sheets

(58) Field of Classification Search
USPC .......................................................... 726/26
See application file for complete search history.

(56) References Cited

U.S. PATENT DOCUMENTS

| | | | | |
|---|---|---|---|---|
| 7,532,740 | B2* | 5/2009 | Levy ..................... | G06T 1/0028 380/51 |
| 7,636,712 | B2* | 12/2009 | Larimore .......... | G06F 17/30011 |
| 8,176,559 | B2* | 5/2012 | Mathur ................. | G06F 21/577 713/188 |
| 8,924,852 | B2* | 12/2014 | Ikawa ................. | G06F 21/6245 715/230 |
| 2004/0081332 | A1* | 4/2004 | Tuttle ................. | G06K 9/00442 382/100 |
| 2005/0254086 | A1 | 11/2005 | Shouno | |
| 2005/0264839 | A1* | 12/2005 | Nemoto ................ | G06F 21/608 358/1.13 |
| 2007/0067680 | A1 | 3/2007 | Harada et al. | |
| 2008/0077784 | A1* | 3/2008 | Robinson ............... | G06Q 30/02 713/1 |
| 2008/0114730 | A1* | 5/2008 | Larimore .......... | G06F 17/30011 |
| 2008/0320604 | A1* | 12/2008 | Nakajima ............ | G06F 21/608 726/28 |
| 2009/0161708 | A1* | 6/2009 | Kawai .................. | H01S 5/0683 372/29.021 |
| 2011/0067026 | A1 | 3/2011 | Nishio | |
| 2011/0321120 | A1* | 12/2011 | Saxena ............... | G06F 21/6245 726/1 |
| 2012/0188597 | A1* | 7/2012 | Tokumoto ............. | G06F 21/608 358/1.15 |
| 2013/0090132 | A1* | 4/2013 | Terada .................. | H04W 4/021 455/456.1 |
| 2013/0214994 | A1* | 8/2013 | Tsuda .................... | G06F 3/1423 345/1.1 |
| 2015/0243033 | A1* | 8/2015 | Uemori .............. | A61B 1/00057 382/103 |
| 2015/0363601 | A1* | 12/2015 | Kamishiro .......... | G06F 21/6254 726/26 |
| 2016/0105277 | A1* | 4/2016 | Isshiki .................... | G06F 21/62 380/28 |

FOREIGN PATENT DOCUMENTS

| | | |
|---|---|---|
| JP | 2010-134731 | 6/2010 |
| JP | 2011-059631 | 3/2011 |
| JP | 2011-197830 | 10/2011 |
| JP | 2014-046457 | 3/2014 |
| WO | 2005/081814 | 9/2005 |

OTHER PUBLICATIONS

International Search Report dated Mar. 4, 2014 in PCT/JP2014/051161 filed on Jan. 15, 2014.
Russian Office Action dated Dec. 13, 2016.

* cited by examiner

| PRIORITY | MASKING CONDITION |
|---|---|
| 1 | {IN A CASE OF NUMBER OF HOPS BEING 2 OR MORE, MASKING IS REQUIRED} |
| 2 | {IN A CASE OF "Send to local host", MASKING IS NOT REQUIRED} |
| 3 | {IN A CASE OF "Send to 133.139.22.xxx", MASKING IS NOT REQUIRED} |
| 4 | {IN A CASE OF "Send to 133.139.yyy.yyy", MASKING IS REQUIRED} |
| 5 | {IN A CASE OTHER THAN ABOVE CONDITIONS, MASKING IS REQUIRED} |

FIG.8

| MASKING CHARACTER STRING | NUMBER OF HOPS | PRIORITY | MASKING CONDITION |
|---|---|---|---|
| ANONYMOUS | 0 | 1 | {IN A CASE OF NUMBER OF HOPS BEING 3 OR MORE, MASKING IS REQUIRED} |
| | | 2 | {IN A CASE OF "Send to local host", MASKING IS NOT REQUIRED} |
| | | 3 | {IN A CASE OF "Send to 133.139.22.xxx", MASKING IS NOT REQUIRED} |
| | | 4 | {IN A CASE OF "Send to 133.139.xxx.xxx", MASKING IS REQUIRED} |

FIG.10

| USER NAME | DATE AND TIME | NUMBER OF SIDES | TYPE OF COLOR | SHEET SIZE | NUMBER OF SHEETS |
|---|---|---|---|---|---|
| A | .... | 1 | MONOCHROME | A4 | 5 |

FIG.11

| USER NAME | ... | AMOUNT CONSUMED | UPPER LIMIT |
|---|---|---|---|
| A | ... | 83 | 100 |
| B | ... | 50 | 100 |
| C | ... | 120 | 100 |

FIG.12

| SETTING ITEM | VALUE | COEFFICIENT |
|---|---|---|
| COLOR TYPE | MONOCHROME | 1 |
| COLOR TYPE | COLOR | 3 |
| SHEET SIZE | A4 | 1 |
| SHEET SIZE | A3 | 2 |
| : | : | : |

INFORMATION PROCESSING APPARATUS, INFORMATION PROCESSING SYSTEM, AND INFORMATION PROCESSING METHOD

The disclosures herein are generally related to an information processing apparatus, an information processing system, and an information processing method.

TECHNICAL FIELD

There is disclosed in related art a technology in which an apparatus generates logs including user IDs of users, and changes operations of the apparatus, and the like for each of the users (e.g., Japanese Laid-open Patent Publication No. 2011-059631: Patent Document 1). That is, Patent Document 1 discloses a technology in which the amount of the apparatus usage is recorded for each of the users based on a corresponding one of the logs generated by the apparatus, and the user using (accessing) the apparatus is limited when the amount of usage (access) of the apparatus reaches a predetermined condition.

Further, in the disclosed technology, the usage of the apparatus may be estimated for each of the users or each of the groups, such as divisions or departments, by storing and accumulating such logs.

BACKGROUND ART

However, work regulations, and the like in some countries or regions prohibit such logs associating user IDs or the like that may specify individuals within the logs from being permanently stored in order to prevent disadvantages of employee's personnel evaluations.

Accordingly, logs that are generated without an association with the user IDs may be stored in such countries or regions.

However, even in these countries or regions, there is still a need for using functions of the apparatus utilizing the user IDs associated with the logs which are generated by the apparatus, such as usage limitations or access limitations or the like of the apparatus, based on the amount of usage.

In that case, it may be difficult to provide highly convenient services for the users of the apparatus in the above countries or regions by simply generating logs without being in association with the user IDs.

RELATED ART DOCUMENTS

Patent Document

Patent Document 1: Japanese Laid-open Patent Publication No. 2011-059631

DISCLOSURE OF THE INVENTION

It is a general object of at least one embodiment of the present invention to provide an information processing apparatus, an information processing system, and an information processing method that substantially obviate one or more problems caused by the limitations and disadvantages of the related art.

Specifically, the embodiments of the present invention may provide an information processing apparatus, an information processing system, and an information processing method in which the users may be protected without degrading serviceability associated with the apparatus.

According to one embodiment of the present invention, there is provided an information processing apparatus that includes a determination unit configured to determine whether data including identification information of a user satisfy a condition to conceal the identification information, the data being generated when the user uses an apparatus, the condition being stored in a condition storage; a concealing unit configured to execute a concealing process to conceal the identification information included in the data when the data satisfy the condition; and a data storage configured to store one of the data including the identification information and data including the concealed identification information.

BRIEF DESCRIPTION OF THE DRAWINGS

FIG. 7 is a diagram illustrating a configuration example of a masking condition table;

FIG. 8 is a diagram illustrating a configuration example of masking information;

FIG. 10 is a diagram illustrating a configuration example of the operation log;

FIG. 11 is a diagram illustrating a configuration example of a usage information storage; and FIG. 12 is a diagram illustrating a configuration example of a coefficient table.

MODE FOR CARRYING OUT THE INVENTION

Figure 1:
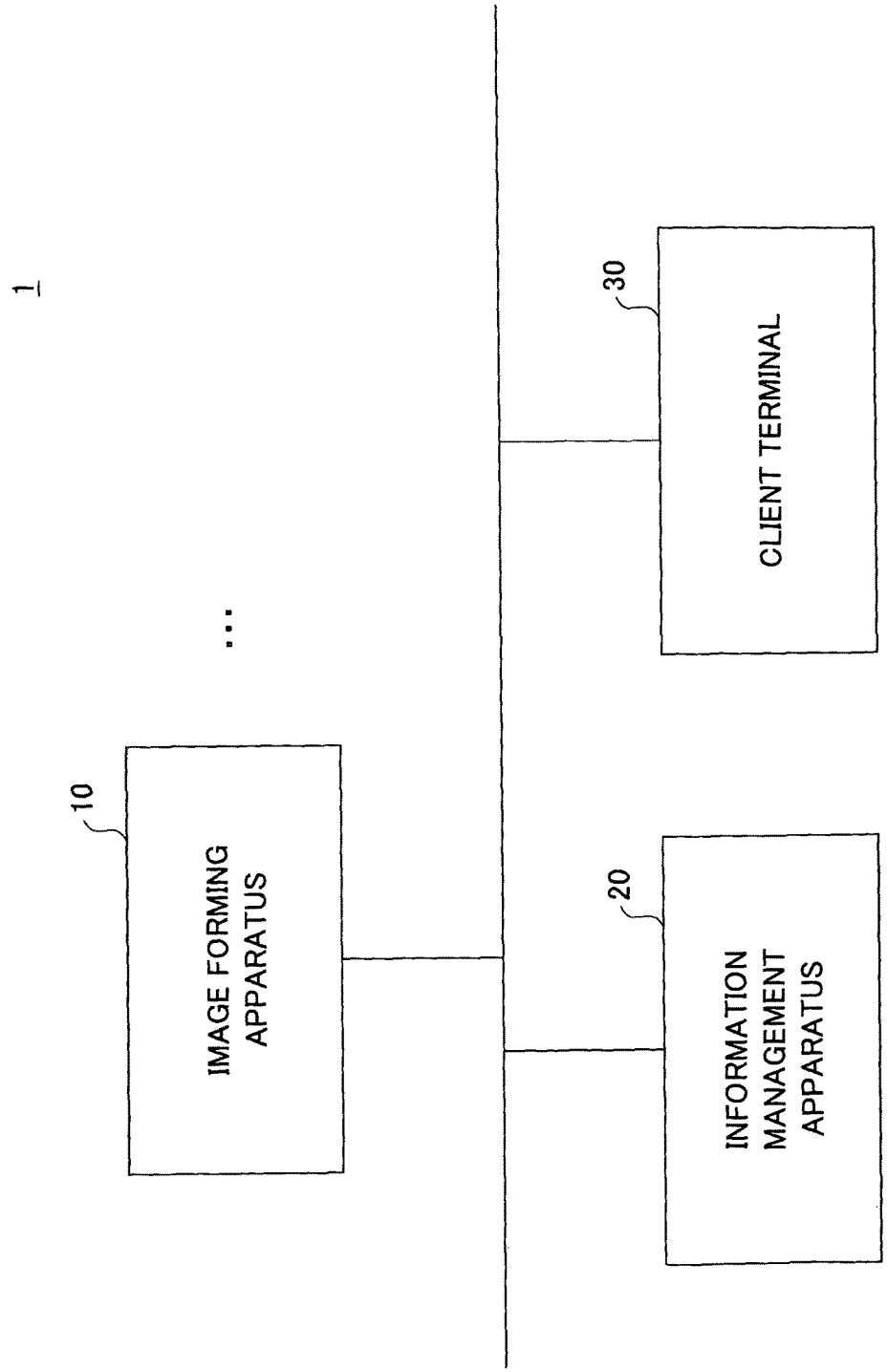
FIG. 1 is a diagram illustrating a configuration example of an information processing system in an embodiment of the present invention.

In the following, a description is given of preferred embodiments of the present invention with reference to the accompanying drawings. FIG. 1 is a diagram illustrating a configuration example of an information processing system in an embodiment of the present invention. As illustrated in FIG. 1, an information processing system 1 includes one or more image forming apparatuses 10, an information management apparatus 20, and a client terminal 30. Each of the image forming apparatuses 10 and the information management apparatus 20 are connected such that the image forming apparatuses 10 and the information management apparatus 20 may communicate with one another via a network such as a LAN (local area network) or the Internet, regardless of wired or wireless connections.

The image forming apparatus 10 is a multifunctional peripheral that implements two or more of functions such as printing, scanning, copying, transmitting-receiving a facsimile into one apparatus. However, an apparatus having any one of the above functions may be used as the image forming apparatus 10.

The information management apparatus 20 is configured to manage information associated with a usage status of one or more image forming apparatuses 10 in a unitary fashion. For example, the information management apparatus 20 uniformly manages log data (hereinafter referred to as "operation logs") generated by the image forming apparatus 10 based on operating behaviors of the image forming apparatus according to user's operations (i.e., the user accessing or using the image forming apparatus 10), information derived from the operation logs, or the like.

The client terminal 30 is used for browsing information stored in the image forming apparatus 10, information managed by the information management apparatus 20, and the like. For example, the terminal apparatus 30 may be a PC (personal computer), a tablet terminal, a smartphone, or a mobile phone.

Figure 2:
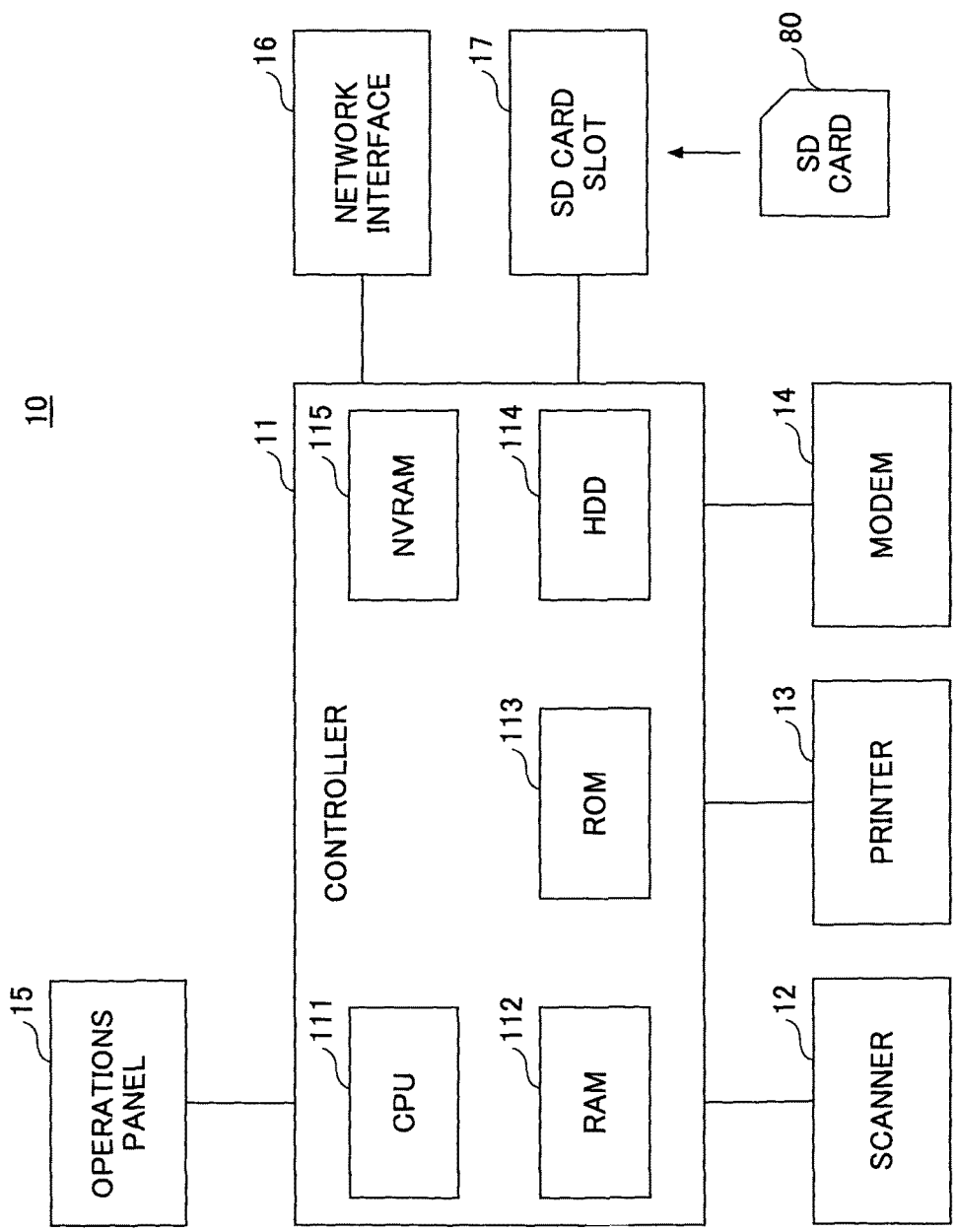
FIG. 2 is a diagram illustrating a hardware configuration example of an image forming apparatus in an embodiment of the present invention.

FIG. 2 is a diagram illustrating a hardware configuration example of the image forming apparatus 10 in an embodiment of the present invention. As illustrated in FIG. 2, the image forming apparatus 10 includes hardware such as a controller 11, a scanner 12, a printer 13, a modem 14, an operations panel 15, a network interface 16, and an SD (secure digital) card slot 17.

The controller 11 includes a CPU (central processing unit) 111, a RAM (random-access memory) 112, a ROM (read-only memory) 113, an NVRAM (nonvolatile random-access memory) 114, and an HDD (hard disk drive) 115. The ROM 113 is configured to store data used by various programs and the like. The RAM 112 is configured to serve as a storage area for loading the programs, a working area for the loaded programs, and the like. The CPU 111 is configured to implement various functions by executing the programs loaded into the RAM 112. The HDD 114 is configured to store various types of data used by the programs and the like. The NVRAM 115 is configured to store various setting information and the like.

The scanner 12 serves as hardware (i.e., an image reading unit) for reading image data from a document. The printer 13 is hardware (i.e., a printer unit) for printing print data onto printing sheets. The modem 14 is hardware for connecting the image forming apparatus 10 to a telephone circuit, and used for transmitting and receiving image data via a FAX communications. The operations panel 15 is hardware having an input unit such as a button for receiving an input from a user, a display unit such as a liquid crystal panel, and the like. The network interface 16 is hardware for connecting the image forming apparatus 10 to a network such as a LAN (local area network) regardless of wired or wireless connections. The SD card slot 17 is, used for reading the programs recorded on an SD (secure digital) card 80. That is, in the image forming apparatus. 10, not only are the programs recorded on the ROM 113 loaded into the RAM 112, but the programs recorded on the SD card may also be loaded into the RAM 112. Those loaded programs may be subject to execution. Note that the SD card 80 may be replaced with another recording medium such as a CD-ROM (compact disk read-only memory), or a USB (universal serial bus) memory. That is, the recording medium corresponding to the SD card 80 is not limited to a predetermined type. In this case, the SD card slot 17 may be replaced with any type of the recording medium.

Figure 3:
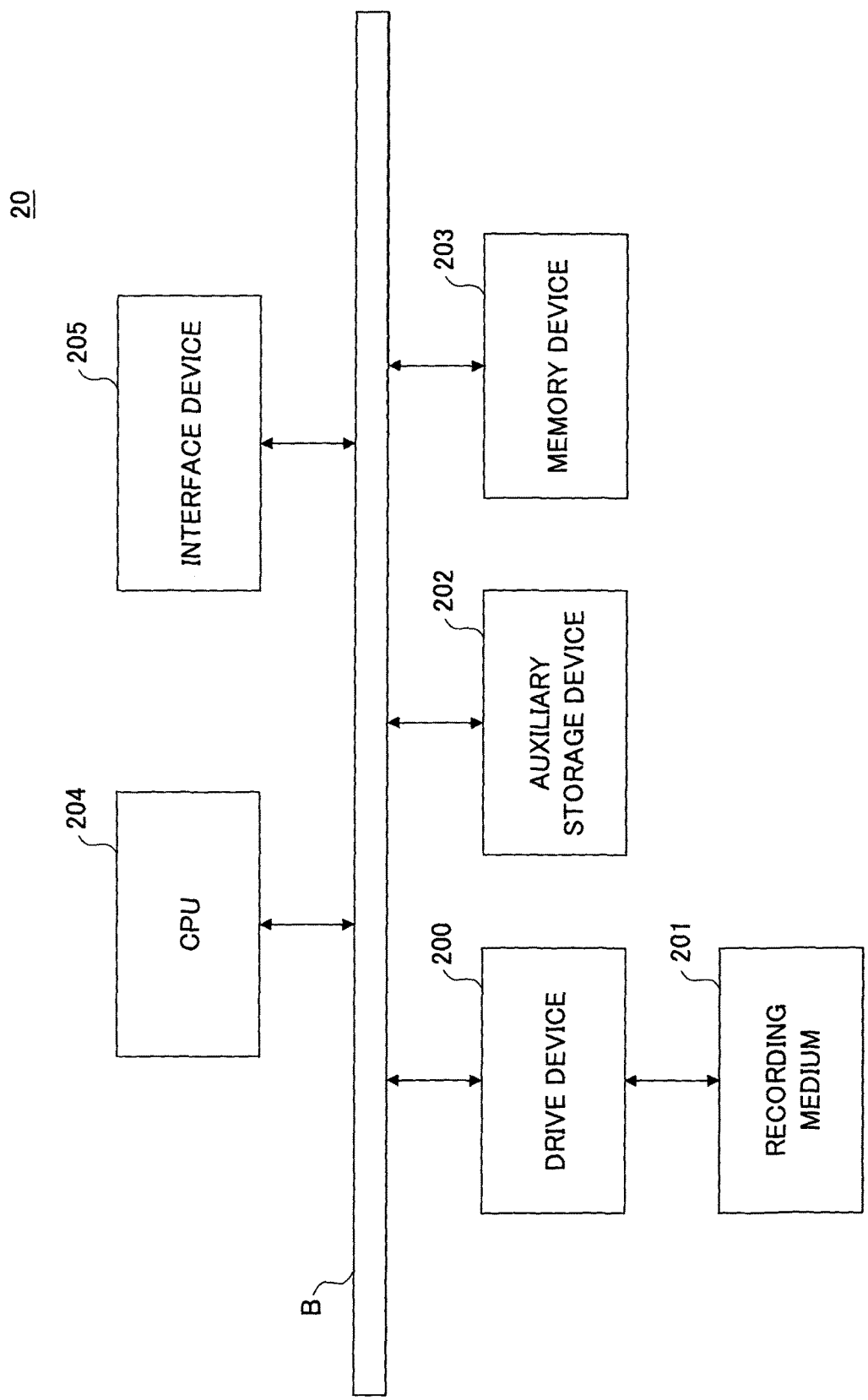
FIG. 3 is a diagram illustrating a hardware configuration example of an information management apparatus in an embodiment of the present invention.

FIG. 3 is a diagram illustrating a hardware configuration example of the information management apparatus in an embodiment of the present invention. As illustrated in FIG. 3, the information management apparatus 20 includes a drive device 200, an auxiliary storage device 202, a memory device 203, a CPU (central processing unit) 204, and an interface device 205, which are connected to one another via a bus B.

Programs that implement processes in the information management apparatus 20 may be provided in a form of a recording medium 201 such as a CD-ROM. When the recording medium 201 storing the programs is set in the drive device 200, the programs are installed in the auxiliary storage device 202 via the drive device 200. Note that the programs are not necessarily installed via the recording medium 201. The programs may be downloaded from another computer via a network. The auxiliary storage device 202 is configured to store the installed programs as well as storing necessary files or data.

The memory device 203 is configured to retrieve a certain program from the auxiliary storage device 202 and store the retrieved program when receiving an instruction to activate the program (i.e., a program activating instruction). The CPU 204 is configured to execute a function associated with the information management apparatus 20 in compliance with the program stored in the memory device 203. The interface device 205 is configured to serve as an interface for connecting the information management apparatus 20 to a network.

Figure 4:
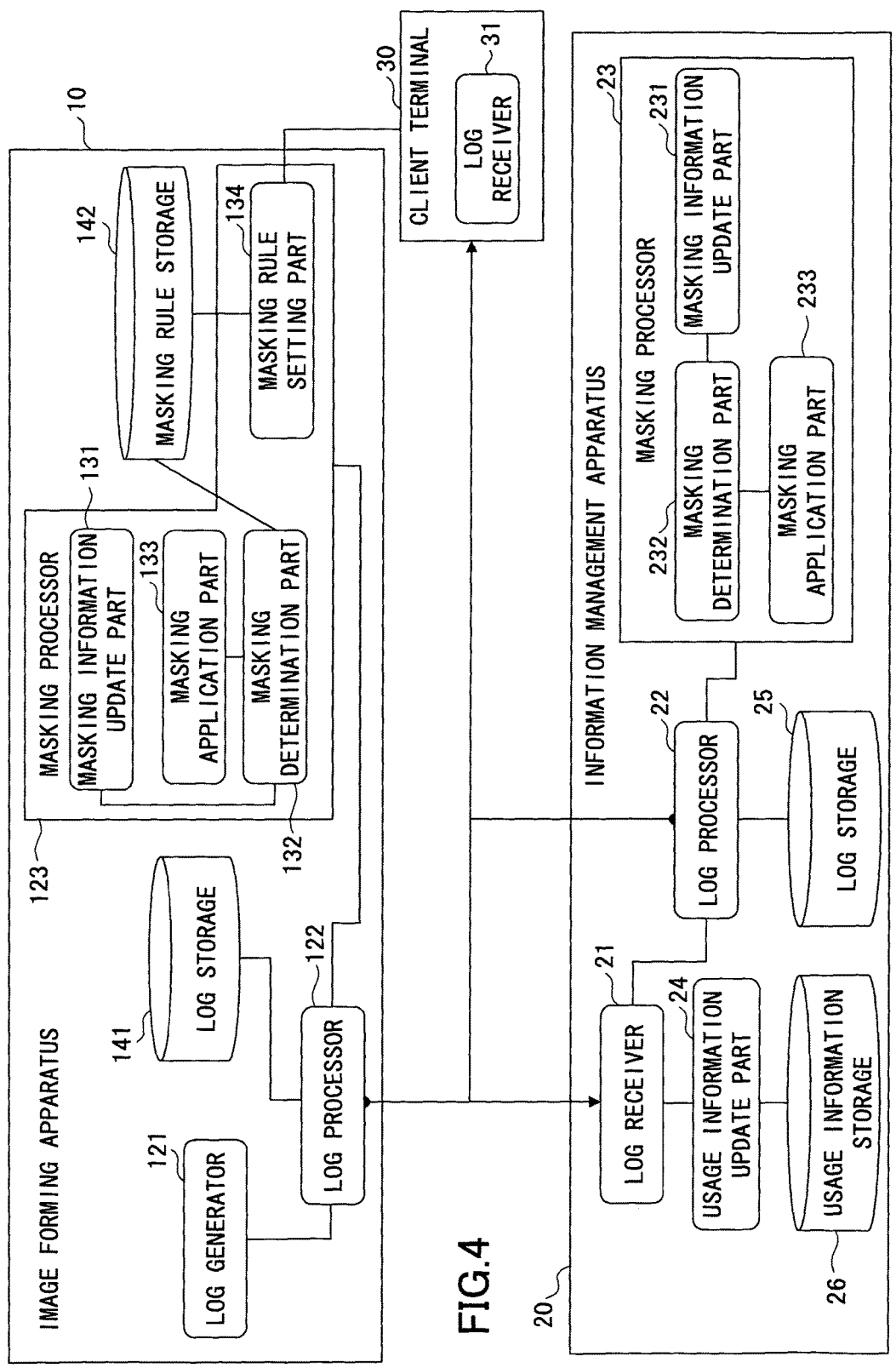
FIG. 4 is a diagram illustrating functional configuration examples of the apparatuses in an embodiment of the present invention.

FIG. 4 is a diagram illustrating a functional configuration example of each of the apparatuses in an embodiment of the present invention. In FIG. 4, the image forming apparatus 10 includes a log generator 121, a log processor 122, and a masking processor 123. The above components of the image forming apparatus 10 may be implemented by causing the CPU 111 to execute the programs installed on the image forming apparatus 10. The image forming apparatus 10 further includes a log storage 141, a masking rule storage 142, and the like. Each of the above storages may be implemented by utilizing a storage device connected to the HDD 14 or the image forming apparatus 10 via the network.

The log generator 121 is configured to generate an operation log. For example, the operation log may be generated every time the image forming apparatus 10 executes a process in response to a request from a user (e.g., for each job). The operation log includes a user name serving as an example of identification information of the user. The log processor 122 is configured to transfer the operation log to the information management apparatus 20. However, in this embodiment, the operation logs may be transferred simultaneously at a predetermined timing. The log processor 122 saves (stores) in the log storage 141 the operation logs generated by the predetermined timing of the log transfer time. The log processor 122 requests the masking processor 123 to execute a process associated with masking each of the operation logs subject to storing or subject to transferring before storing the operation log in the log storage 141, or before transferring the operation log to the information management apparatus 20.

The masking processor 123 executes the process associated with the masking on the operation log. The masking in this embodiment may be defined as a process to conceal the user name contained in the operation log. In the present embodiment, the user name is masked (i.e., concealed) by replacing the user name within the operation log with a predetermined character string. However, a method for the masking process or masking is not limited to the process in which the user name within the operation log is replaced with the predetermined character string. For example, the masking process or masking may be implemented by deleting the user name from the operation log. Alternatively, the masking may be reversible or irreversible according to a required level of concealment. For example, the masking of the user may be implemented by a reversible process such as encrypting the user name insofar as a person who is browsing raw (unprocessed) operation logs is unable to specify a relationship between each of the operation logs and a corresponding one of the users (user names). On the other hand, when the user name is not allowed to be restored from being masked, the masking process or masking may be implemented by an irreversible process.

In FIG. 4, the masking processor 123 includes a masking information update part 131, a masking determination part 132, a masking application part 133, and a masking rule setting part 134.

The masking information update part 131 is configured to associate masking information with an unassociated masking information operation log, or update the content of the masking information that is already associated with the operation log. That is, the masking information update part 131 is configured to associate masking information with each of the operation logs. The masking information indicates information including a masking rule stored in the masking rule storage 142. The masking rule indicates information including a condition in which masking is applied (hereinafter referred to as "masking conditions"), and a character string to be applied to the mask. Note that the association of masking information with the operation log differs from the application of a masking to the user name contained in the operation log.

The masking determination part 132 determines whether the application of the masking is required based on the masking information with which the corresponding operation log is associated. The masking application part 133 applies the masking to the user name within the operation log with respect to which the masking determination part 133 determines that the application of the masking is required. The masking rule setting part 134 sets the masking rule to the masking rule storage 142 based, for example, on the instruction from the client terminal 30.

The information management apparatus 20 includes a log receiver 21, a log processor 22, a masking processor 23, and a usage information update part 24. The above components of the information management apparatus 20 may be implemented by causing the CPU 204 to execute the programs installed on the information management apparatus 20. The information management apparatus 20 further includes a log storage 25, a usage information storage 26, and the like. Each of the above storages may be implemented by utilizing a storage device connected to the auxiliary storage device 202 or the information management apparatus 20 via a network.

The log receiver 21 is configured to receive an operation log transmitted from the image forming apparatus 10. The log receiver 21 is configured to further input the received operating log into each of the log processor 22 and the usage information update part 24.

The functions of the log processor 22, the masking processor 23, and the log storage 25 are similar to those of the log processor 122, the masking processor 123, and the log storage 141. However, the masking processor 23 does not include the masking rule setting part 134. Since the information management apparatus 20 does not include a storage corresponding to the masking rule storage 142, the information management apparatus 20 does not require the settings of the masking rule.

Further, the log storage 141 differs from the log storage 25 in the following point. That is, whereas the log storage 141 is configured to temporarily store the operation logs, the log storage 25 is configured to store the operation logs permanently or over a long period of time. In the present embodiment, the operation logs are allowed to contain the user names when the operation logs are temporarily stored (e.g., within several hours or within several days), and the operation logs are not allowed to contain the user names when the operation logs are stored permanently or over a long period of time. Hence, when the operation log is stored in the log storage 141, this operation log is allowed to contain the corresponding user name. On the other hand, when the operation log is stored in the log storage 25, this operation log is not allowed to contain the corresponding user name.

The usage information update part 24 updates usage information stored in the usage information storage 26 based on the operation log. The usage information indicates a usage status of the image forming apparatus 10. The usage information storage 26 is configured to store usage information for each of the user names.

The client terminal 30 include a log receiver 31. The log receiver 31 may be implemented by causing a CPU 30 of the client terminal 30 to execute programs installed on the client terminal 30. The log receiver 31 is configured to receive the operation log stored in the log storage 141 of the image forming apparatus 10, or the log storage 25 of the information management apparatus 20. The received operation log may be displayed, for example, on a display device of the client terminal 30.

A description will be given below of a process executed by the information processing system 1. Initially, a masking process executed by the masking processors 132 or 23 with respect to an operation log is described.

Figure 5:
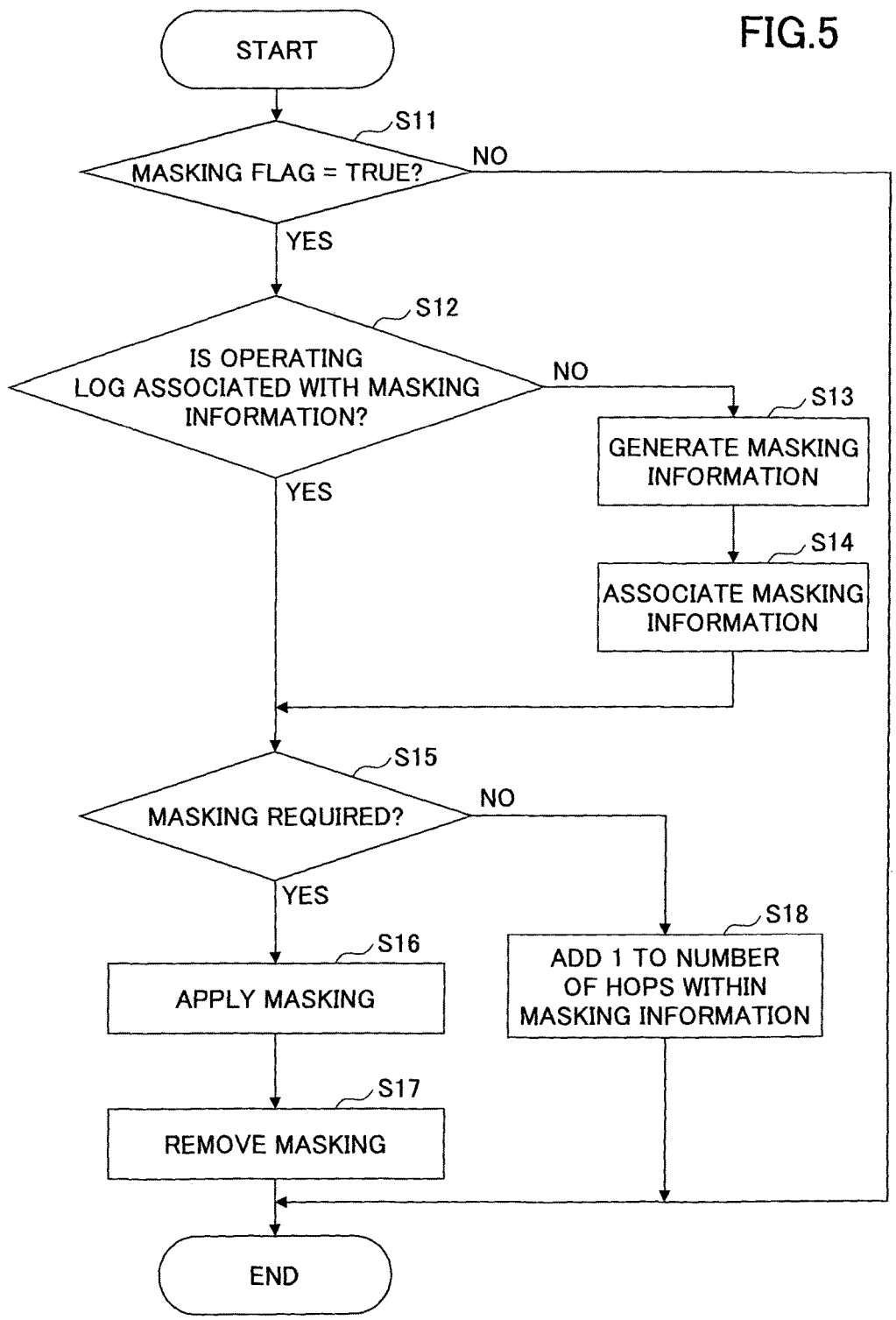
FIG. 5 is a flowchart illustrating an example of a masking process with respect to an operation log.

FIG. 5 is a flowchart illustrating an example of the masking process with respect to the operation log. The process illustrated in FIG. 5 is executed when the masking processors 123 or 23 is requested by the log processors 122 or 22 to execute the masking process with respect to the operation log. In FIG. 5, the masking processor 123 is represented as an executing entity for convenience of illustration; however, the masking processor 23 may also execute the masking process based on the same logic as that used by the masking processor 123.

In step S11, the masking information update part 131 determines whether a masking flag is "TRUE" by referring to a masking execution table T1 stored in the masking rule storage 142 (step S11).

Figure 6:
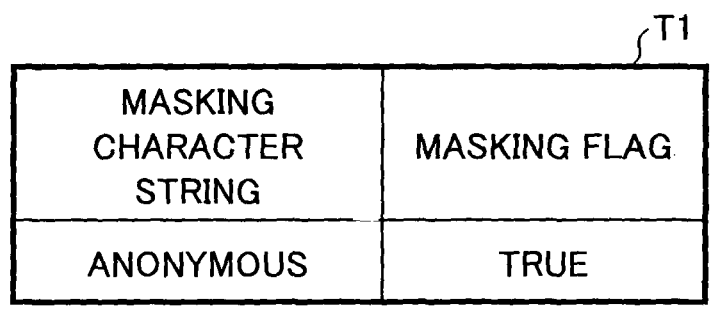
FIG. 6 is a diagram illustrating a configuration example of a masking execution table.

FIG. 6 is a diagram illustrating a configuration example of the masking execution table T1. In FIG. 6, the masking information includes a value for each of the items, such as a masking character string, a flag, and the like. The value of the masking character string is a character string that is replaced with the user name. In FIG. 6, the value "ANONYMOUS" is set as the masking character string, for example. Masking is applied by replacing the user name contained in each of the operation logs with "ANONYMOUS". The value of the masking flag indicates whether to require the masking process. The value "TRUE" indicates that the masking process is required, and the value "FALSE" indicates that the masking process is not required.

Thus, in step S11, whether to require the masking process is determined. When the masking flag is "FALSE" ("NO" in step S11), steps subsequent to step S11 will not be executed. In this case, the operation log subject to the masking process is returned to the masking processor 123 as it is without the masking process being applied.

On the other hand, when the masking flag is "TRUE" ("YES" in step S11), the masking information update part 131 determines whether masking information is already associated with the operation log subject to the masking process (hereinafter called a "target operation log") (step S12). When an operation log generated in the image forming apparatus 10 serves as the first target operation log (i.e., the first operation log subject to the masking process), the (first) target operation log is not associated with the masking information.

When the masking information is not associated with the target operation log ("NO" in step S12), the masking information update part 131 generates masking information with respect to the target operation log (step S13). The masking information is generated based on the masking execution table T1 illustrated in FIG. 6, and the masking condition table T2 stored in the masking rule storage 142.

FIG. 7 is a diagram illustrating a configuration example of the masking condition table T2. In FIG. 7, the masking condition table T2 stores one or more masking conditions in the order of priority. The masking condition having a priority "1" indicates that "in a case of the number of hops being two or more, masking is required". In this embodiment, the number of hops indicates a variable associated with each of the operation logs contained in the masking information. The number of hops may be incremented every time the application of the masking being required or not being required is determined. Hence, the number of hops may be equivalent to the number of times that the application of the masking is required or not required is determined. Thus, "the number of hops being two or more" may be equivalent to "whether the application of the masking is required or not required is determined two or more times".

The masking condition having a priority "2" indicates that "in a case of Send to localhost, the masking is not required". Note that the "localhost" indicates the image forming apparatus 10 serving as an operation log generating source. Hence, the "case of Send to localhost" corresponds to a "case where the operation log is stored in the log storage 141".

The masking condition having a priority "3" indicates that "in a case of "Send to 133.139.22.xxx, the masking is not required". That is, in a case where the operation log is transferred to an external apparatus having the IP address "133.139.22.xxx", the masking is not required. Note that "xxx" indicates a specific number. However, the IP address specified in the masking conditions may include wildcards or a specified range. In this embodiment, the IP address of the information management apparatus corresponds to "133.139.22.xxx".

The masking condition having a priority "4" indicates that "in a case of" Send to 133.139.yyy.yyy, the masking is required". That is, in a case where the operation log is transferred to an external apparatus having the IP address "133.139.yyy.yyy", the masking is required. In this embodiment, the IP address of the client terminal 30 corresponds to "133.139.yyy.yyy".

The masking condition having a priority "5" indicates that "in a case other than the above conditions, the masking is required". That is, in a case other than the above-described masking conditions having the respective priorities 1 to 4, the masking is required. This condition is prepared for preventing the user names from leaking in a case where the operation log is transferred to an unexpected address.

Note that in the above conditions, the smaller the value is, the higher the priority will be. That is, the masking condition having the priority "1" has a priority higher than the masking condition having the priority "2". When a case matches two or more masking conditions, the masking condition having the higher priority is employed.

The masking information may be generated as illustrated in FIG. 8, based on the above-described masking condition table T2 and the masking execution table T1 illustrated in FIG. 6.

FIG. 8 is a diagram illustrating a configuration example of the masking information. In FIG. 8, the masking information includes a masking character string, the number of hops, a masking condition, and the like. The masking character string may be acquired from the masking execution table T1. The masking condition may be acquired from the masking condition table T2. The number of hops is a variable configured to be updated based on the determination as to whether the application of the masking is required. Note that in this embodiment, an initial value for the number of hops at the time of generating the masking information may be 0 (zero).

Subsequently, the masking information update part 131 associates the generated masking information with the target operation log (step S14). For example, the masking information may be appended to the end of the operation log.

On the other hand, when the operation log is already associated with the masking information ("YES" in step S12), steps S13 and S14 will not be executed.

Subsequently, the masking determination part 132 determines whether the application of the masking is required based on the masking condition contained in the masking information with which the target operation log is associated (step S15). Note that the number of hops contained in the masking information is subject to being compared with the number of hops in the masking condition having the priority "1".

When it is determined that the masking is required ("YES" in step S15), the masking information update part 133 applies masking to the target operation log (step S16). That is, the user name contained in the target operation log is replaced with the masking character string contained in the masking information associated with the target operation log. Subsequently, the masking information update part 133 removes the masking information associated with the target operation log (step S17). That is. The masking information is removed from the target operation log. Hence, when steps S16 and S17 are executed, the user name is replaced with the masking character string, and the operation log that is no longer associated with the masking information is returned to the log processor 122.

On the other hand, when it is determined that the masking is not required ("NO" in step S15), the masking information update part 131 adds one to the number of hops contained in the masking information associated with the target operation log (step S18). In this case, the user name is not masked, and the masking information associated with the target operation log is returned to the log processor 122.

Figure 9:
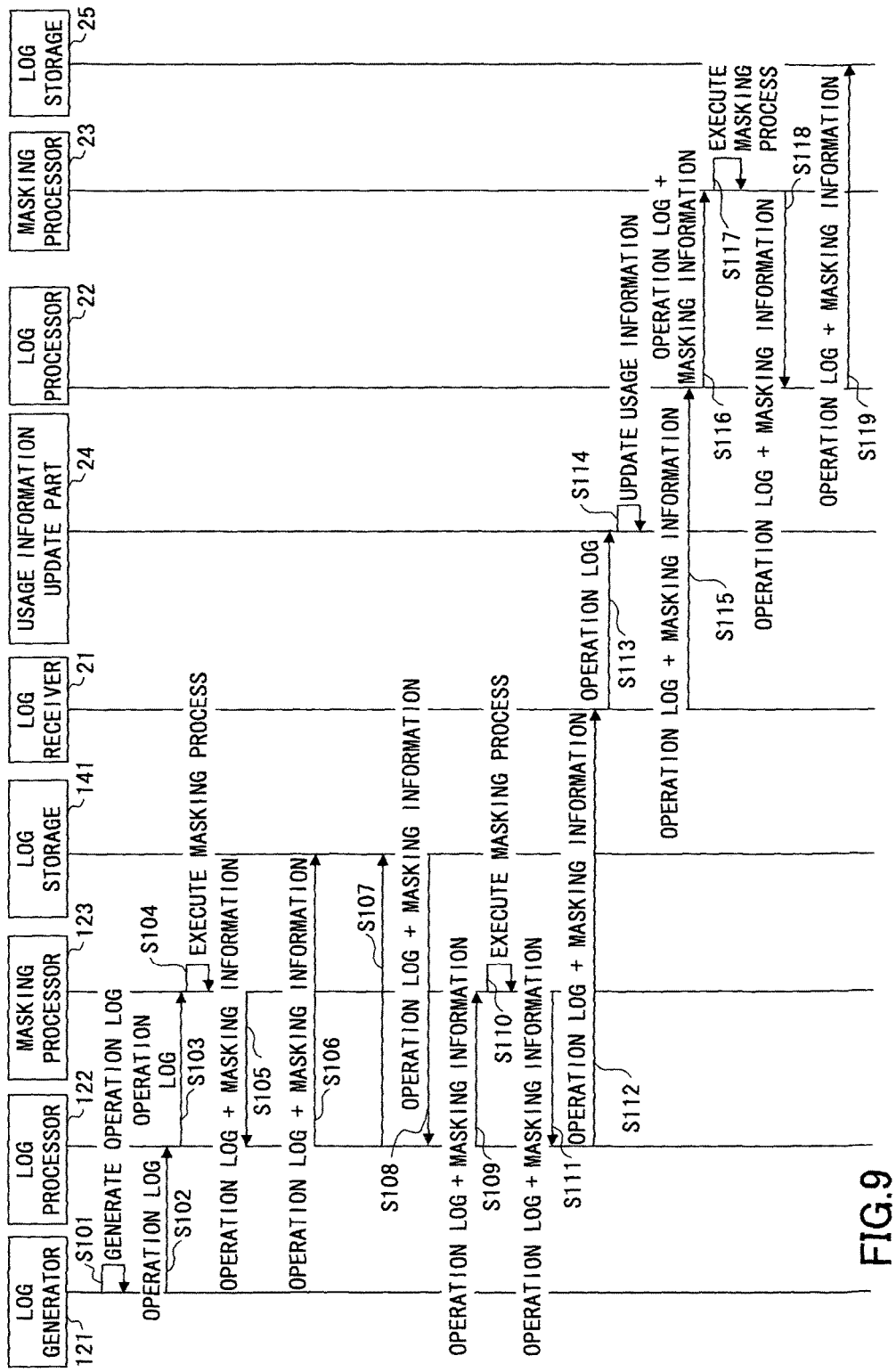
FIG. 9 is a sequence diagram illustrating an example of a process associated with the operation log.

Next, an entire process associated with the operation log in the information processing system 1 is described. FIG. 9 is a sequence diagram illustrating an example of a process associated with the operation log.

For example, when the image forming apparatus 10 executes a process such as some kind of a job or the like based on a request from a user, a log generator 121 generates an operation log associated with such a process (step S101). Note that the request from the user is not necessarily input via the operations panel 15. For example, an operation log is generated with respect to a print job that is executed in response to the reception of the print data.

FIG. 10 is a diagram illustrating a configuration example of the operation log. FIG. 10 illustrates an example of an operation log corresponding to a job. In FIG. 10, the operation log includes a value for each of items, such as a user name, date and time, the number of sides, a color type, a size of a sheet, and the like. The user name is a name of a user who is the request source of a process (a job) associated with an operation log. For example, when the operation log is associated with a process in response to a request input via the operations panel 15, the operation log includes a login user name (i.e., a name of a user logged into the image forming apparatus 10). For example, when the operation log is associated with a process in response to a request input via the operations panel 15, the operation log includes a login user name (i.e., a name of a user logged into the image forming apparatus 10). Note that the operation log in FIG. 10 indicates that monochrome printing is performed on a single side of each of five A4 size sheets.

Subsequently, the log generator 121 requests the log processor 122 to process the generated operation log (step S102). The log processor 122 requests the masking processor 123 to execute the masking process for storing the operation log in the log storage 141 (step S103). This request designates the operation log and "localhost" indicating the log storage 141 as an address of the operation log.

The masking processor 123 executes the masking process on the operation log (step S104). The detail of the masking process is illustrated in FIG. 5. In this step, the masking information is not associated with the operation log subject to processing. Hence, the masking information illustrated in FIG. 8 is generated, and the generated masking information is associated with the operation log.

Further, the number of hops in the masking information in step S15 in FIG. 5 is ten. Hence, this does not satisfy the masking condition having the priority "1". On the other hand, the address of the operation log is "localhost" (i.e., the log storage 141), which satisfies the masking condition having the priority "2". Thus, it is determined that the masking is not required. As a result, the number of hops in the masking information is incremented by one. That is, in this embodiment, the masking condition having the priority "2" is used for avoiding the application of the masking when the operation log is stored in the log storage 141.

Subsequently, the log processor 123 returns to the log processor 122 a response including the operation log with which the masking information is associated (step S105).

Subsequently, the log processor 122 stores in the log storage 141 the operation log with which the masking information is associated (step S106). As can be clear from the above, the masking is not applied to the operation log stored in the log storage 141, and the masking information having the number of hops is "1" is associated with the operation log stored in the log storage 141.

Subsequently, steps subsequent to step S107 are executed every time the operation log is transferred to the information management apparatus 20. For example, the time at which the operation log is transferred may be every time the login user logs out or may be on a regular basis. Alternatively, the time at which the operation log is transferred may be a predetermined set time.

In step S107, the log processor 122 acquires the operation log stored in the log storage 141 (steps S107 and S108). Note that each of the acquired operation logs is associated with the masking information. Note also that in step S107, all the operation logs stored in the log storage 141 or a part of the operation logs may be acquired. In any case, the acquired operation logs are deleted from the log storage 141 by the log processor 122.

Note that in FIG. 9, unless otherwise noted, the masking information is associated with the operation log in steps subsequent to step S109.

In step S109, the log processor 122 requests the masking processor 123 to execute the masking process for transmitting the operation log to the information management apparatus 20. This request designates the operation log and an IP address of the information management apparatus 20 serving as an address of the operation log. Note that the IP address of the information management apparatus 20 may, for example, be stored in advance in the HDD 114.

The masking processor 123 executes the masking process on the operation log (step S110). The details of the masking process is illustrated in FIG. 5. Note that the operation log subject to processing is associated with the masking information. Hence, the determination result in step S12 is "YES", and step S15 is then executed as illustrated in FIG. 5. In step S15, the number of hops in the masking information is one, which does not satisfy the masking condition having the priority "1". Further, the address of the operation log is the information management apparatus 20, which does not satisfy the masking condition having the priority "2", but satisfies the masking condition having the priority "3". Thus, it is determined that the masking is not required. As a result, the number of hops in the masking information is incremented by one, which results in the number of hops in the masking information being two. That is, in this embodiment, the masking condition having the priority "3" is used for avoiding the application of the masking when the operation log is transferred to the information management apparatus 20.

Note that in a case where the operation log stored in the log storage 141 is transmitted to the client terminal 30, the masking is applied to the operation log based on the masking condition having the priority "2". That is, the masking condition having the priority "2" is used for applying the masking when the operation log is transmitted to the client terminal 30. The masking condition having the priority "2" is used for preventing a user from being specifically identified for each of the operation logs via the client terminal 30 in which the operation logs may be browsed.

Thus, the operation log stored in the log storage 141 is acquired, and the masking process is executed on the acquired operation log every time the operation log is subject to execution of some kind of a process.

Subsequently, the log processor 123 returns to the log processor 122 a response including the operation log with which the masking information having the number of hops updated with "two" is associated (step S111). Subsequently, the log processor 122 transmits the operation log to the information management apparatus 20 (step S112).

When the log receiver 21 of the information management apparatus 20 receives the operation log transmitted to the image forming apparatus 10, the log receiver 21 inputs the received operation log into each of the usage information update part 24 and the log processor 22 (steps S113 and S115). Note that the masking information may be removed from the operation log that is input into the usage information update part 24.

The usage information update part 24 updates the content of the usage information storage 26 based on the received (input) operation log (step S114).

FIG. 11 is a diagram illustrating a configuration example of the usage information storage 26. As illustrated in FIG. 11, the usage information storage 26 stores a user name, an amount consumed, an upper limit and the like for each of the users.

The amount consumed corresponds to the number of points consumed. A point is an index representing the degree of the use of the image forming apparatus 10. The upper limit is an upper limit of the points in a predetermined period. Note that the amount consumed may be initialized with zero "0" every predetermined period (e.g., every month). That is, the upper limit is an upper limit with respect to the predetermined period.

In step S114, the amount consumed (the number of points consumed) is computed based on the input operation log, and the computed result is added to the amount consumed corresponding to the user name contained in the operation log. The computation of the number of points consumed (the amount consumed) based on the operation log may, for example, be carried out by referring to a coefficient table T3 stored in the auxiliary storage device 202.

FIG. 12 is a diagram illustrating a configuration example of the coefficient table T3. As illustrated in FIG. 12, the coefficient table T3 stores a coefficient for each of values of setting items for a print job. In this embodiment, the number of points consumed (the amount consumed) is computed based on the following formula.

Number of sheets×Number of sides×Color type coefficient×Sheet size coefficient

For example, the number of points consumed (the amount consumed) with respect to the operation log illustrated in FIG. 10 may be computed as follows.

5×1×1×1=5

In this case, five (5) may be added to the amount consumed (the number of points consumed) corresponding to the user A.

Hence, since the masking is prevented from being applied with respect to the operation log until the usage information update part 24 uses the operation log, the usage information update part 24 may be able to carry out a process using the user name contained in the operation log.

Note that the amount consumed (the number of points consumed) and the upper limit corresponding to the user may be acquired from the image forming apparatus 10 when the user logs into the image forming apparatus 10. The image forming apparatus 10 may, for example, limit the user's use of the image forming apparatus 10 when the amount consumed and the upper limit have a predetermined relationship (e.g., Amount consumed>Upper limit).

On the other hand, the log processor 22 requests the masking processor 123 to execute the masking process for storing the operation log in the log storage 25 (step S116). This request designates the operation log and identification information indicating the log storage 25 as an address of the operation log. Note that the identification information is not "localhost". In this embodiment, the "localhost" indicates the image forming apparatus 10 serving as an operation log generating source; however, the information management apparatus 20 does not serve as the operation log generating source.

The masking processor 23 executes the masking process on the operation log (step S117). The detail of the masking process is illustrated in FIG. 5. Note that the operation log subject to processing is associated with the masking information. Hence, the determination result in step S12 is "YES", and step S15 is then executed as illustrated in FIG. 5. In step S15, the number of hops in the masking information is two, which satisfies the masking condition having the priority "1". Thus, it is determined that the masking is required. As a result, the masking is applied to the operation log, and the masking information is then removed from the operation log. That is, in this embodiment, the masking condition having the priority "1" is used for applying the masking to the operation log to be stored in the log storage 25 of the information management apparatus 20.

Subsequently, the log processor 23 returns to the log processor 122 a response including the operation log with respect to which the masking is applied and the masking information is removed (step S118).

Subsequently, the log processor 22 stores the operation log in the log storage 25 (step S119). As can be clear from the above, the masking is applied to all the operation logs stored in the log storage 25. Hence, it may be possible to satisfy a requirement which will not allow the operation logs stored in the log storage 25 to include user names.

Note that the information management apparatus 20 may be hierarchically structured. In this case, the operation logs may permanently be stored in the information management apparatus 20 residing in the highest layer, and the operation logs may temporarily be stored in the information management apparatus 20 residing in the intermediate layer. Note that the operation logs may be deleted or removed from the information management apparatus 20 residing in the intermediate layer when the operation logs are transferred to the information management apparatus 20 residing in the highest layer. That is, masking is applied to the information management apparatus 20 in the highest layer, and masking is not applied to the information management apparatus 20 in the intermediate layer. Hence, the value of the number of hops in the masking condition having the priority "1" may be adjusted based on the number of layers of the hierarchical structure.

Further, each of the operation logs is not necessarily associated with the masking information. In this case, the masking determination part 132 may determine whether to apply the masking to the operation log by directly referring to the masking condition table T2. Further, the information management apparatus 20 may also include the masking condition table T2. Alternatively, the masking condition table T2 may be shared between the information management apparatus 20 and the image forming apparatus 10. In this configuration where the masking condition table T2 is shared, the masking condition table T2 may be stored one of the information management apparatus 20 and the image forming apparatus 10 and the other may refer to the masking condition table T2 via the network. Alternatively, the masking condition table T2 may be stored in a storage device to which the information management apparatus 20 and the image forming apparatus may refer. In any of the above cases, the masking determination part 232 of the information management apparatus 20 may determine whether to apply the masking to the operation log by referring to the masking condition table T2. The masking condition having the priority "1" may be excluded from the masking condition table T2.

Note that it is preferable to associate each of the operation logs with the masking information including the masking condition in the image forming apparatuses 10, in a case where the operation logs from the plural image forming apparatuses 10 residing in mutually different countries or regions are transferred to the information management apparatus 20, and user names within the operation logs are handled differently in each of such countries or regions.

For example, it is assumed that an image forming apparatus 10*a* (not illustrated) resides in the country or region that does not allow the user name to be associated with the operation log stored in the log storage 25. Further, an image forming apparatus 10b (not illustrated) and the information management apparatus 20 reside in a country or region that has no such restriction or regulation.

In this condition, when the operation log from the image forming apparatus 10a is associated with the masking information illustrated in FIG. 8, the masking may be applied to the operation log in the information management apparatus 20 as described above. On the other hand, when the operation log from the image forming apparatus 10b is not associated with the masking information, or is associated with the masking information including the masking condition indicating that no masking is required in any cases, the masking will not be applied to the operation log in the information management apparatus 20. As a result, it is possible to apply the masking only to the operation log from the image forming apparatus 10a.

The above-described management may specifically be effective in international companies that extend their business activities to a large number of countries and regions.

Note that another method may be employed in order to differentiate the determination as to whether to apply the masking for each of the image forming apparatuses 10. For example, the information management apparatus 20 may include the masking condition table T2 storing the masking conditions that designate the determination as to whether to apply masking to each of the sending destinations instead of the addresses. In this case, the determination as to whether to apply masking may be differentiated based on from which one of the image forming apparatuses 10 the operation log is transmitted, regardless of whether the masking information is associated with the operation log. Note that each of the operation logs may include identification information specifying the image forming apparatus 10 serving as the sending destination, or identification information specifying the country or region to which the image forming apparatus 10 belong. Alternatively, the masking condition table T2 in the information management apparatus 20 may include the masking condition for each identification information.

As described above, according the present embodiment, the application of the masking to the operation log may be prevented before the process performed by the usage information update part 24, or the like that refers to the user name within the operation log based on a setting content (priority) of the masking condition, and the masking may be applied to the operation log when the operation log is permanently stored.

As a result, the users may be protected without degrading serviceability associated with apparatuses such as the image forming apparatus 10.

The present embodiment may be applied to apparatuses other than the image forming apparatus 10 such as a projector, a videoconference apparatus, or a digital camera.

Note that in the present embodiment, the image forming apparatus 10 may be an example of an apparatus. The image forming apparatus 10 (or the controller 11 of the image forming apparatus 10) and the information management apparatus 20 may each be an example of an image processing apparatus. The masking determination parts 132 and 232 may each be an example of a determination unit. The masking application parts 133 and 233 may each be an example of a concealing unit. The masking information update parts 131 and 231 may each be an example of a recording unit. The log processor 122 may be an example of a transmitter. The masking rule storage 142 may be an example of a condition storage. The log storages 141 and 25 may each be an example of a data storage. The operation log may be an example of data.

According to the disclosed embodiments, the users may be protected without degrading serviceability associated with the apparatuses.

While certain preferred embodiments of the present invention have been described above, the present invention is not limited to these embodiments, and numerous variations and modifications may be made without departing from the scope of the present invention.

The present application is based on and claims the benefit of the priority date of Japanese Patent Application No. 2013-031063 filed on Feb. 20, 2013, the entire contents of which are hereby incorporated by reference.

The invention claimed is:

1. An information processing apparatus, comprising:
a memory; and
a processor configured to
determine whether a condition to conceal identification information of a user is satisfied for data including the identification information, the condition being stored in the memory;
execute a concealing process to conceal the identification information included in the data when the condition is satisfied for the data; and
record a number of determination times the processor determines that the condition is not satisfied for the data, to conceal the identification information for each data, the recorded number being incremented each time the processor determines that the condition is not satisfied for the data, to conceal the identification information, and
a data storage configured to store one of the data including the identification information and the data including the concealed identification information;
a transmitter configured to transmit data stored in the data storage to a predetermined computer via a network; and
a receiver configured to receive the data via the network,
wherein the processor determines whether the condition is satisfied every time for the data that are acquired from the data storage are processed, and the processor executes the concealing process on the data that are acquired from the data storage based on a determination result obtained by the processor,
wherein the condition includes a threshold number of determination times the processor determines that the condition is not satisfied for the data, to conceal the identification information for each data
wherein the processor determines whether the condition is satisfied for the data transmitted by the transmitter to the predetermined computer,
wherein the condition is determined not to be satisfied for the data transmitted by the transmitter to the predetermined computer,
wherein the processor determines whether the condition is satisfied for the data received by the receiver and stored in the data storage, and
wherein the condition is determined to be satisfied for the data received by the receiver and stored in the data storage.

2. An information processing system comprising:
an apparatus; and
an information management apparatus, wherein
the apparatus includes
a first memory; and
a first processor configured to
determine whether a condition to conceal identification information of a user is satisfied for data including the identification information every time the data that are acquired from the data storage are processed, the condition being stored in a condition storage;

execute a concealing process to conceal the identification information included in the data when the first processor determines that the condition; and transmit the data to the information management apparatus, and a receiver configured to receive the data via a network, wherein the information management apparatus includes a second memory;

a second processor configured to receive the data transmitted from the first processor;

determine whether the condition is satisfied for the received data; and execute a concealing process to conceal the identification information included in the received data when the condition is determined to be satisfied for the received data; and a data storage configured to store one of the data including the identification information and data including the concealed identification information, and a transmitter configured to transmit the data stored in the data storage to the first processer via the network, wherein at least one of the first processor and the second processor is configured to further record a number of determination times the processor determines that the condition is not satisfied for the data to conceal the identification information for each data, the recorded number being incremented each time the processor determines that the condition is not satisfied for the data, to conceal the identification information, and the condition includes a threshold number of determination times the processor determines that the condition is satisfied for the data, to conceal the identification information for each data, wherein the second processor determines whether the condition is satisfied for the data transmitted by the transmitter to the predetermined computer, wherein the condition is determined not to be satisfied for the data transmitted by the transmitter to the predetermined computer, wherein the second processor determines whether the condition is satisfied for the data received by the receiver and stored in the data storage, and wherein the condition is determined to be satisfied for the data received by the receiver and stored in the data storage.

3. An information processing method, comprising:

determining whether a condition to conceal identification information of a user is satisfied for data including the identification information, the condition being stored in a condition storage;

executing a concealing process to conceal the identification information included in the data when the condition is satisfied for the data;

storing in a data storage one of the data including the identification information and the data including the concealed identification information;

recording a number of determination times that the condition is not satisfied for the data, to conceal the identification information for each data, wherein the recorded number is incremented each time the processor determines that the condition is not satisfied for the data, to conceal the identification information;

determining whether the condition is satisfied every time for the data that are acquired from the data storage;

executing the concealing process on the data acquired from the data storage are processed based on a determination result of whether the condition is satisfied for the data;

transmitting data stored in the data storage to a predetermined computer via a network;

determining whether the condition is satisfied for the data transmitted to the predetermined computer;

receiving the data via the network; and determining whether the condition is satisfied for the data received and stored in the data storage, wherein the condition includes a threshold number of determination times the processor determines that the condition is not satisfied for the data, to conceal the identification information for each data, wherein the condition is determined not to be satisfied for the data transmitted by the transmitter to the predetermined computer, and wherein the condition is determined to be satisfied for the data received and stored in the data storage.

\* \* \* \* \*